(12) United States Patent
Pritchard

(10) Patent No.: US 12,523,794 B2
(45) Date of Patent: Jan. 13, 2026

(54) MEASURING SNOWFALL

(71) Applicant: UNITED KINGDOM RESEARCH AND INNOVATION, Swindon (GB)

(72) Inventor: Hamish Daniel Pritchard, Cambridge (GB)

(73) Assignee: UNITED KINGDOM RESEARCH AND INNOVATION (GB)

( * ) Notice: Subject to any disclaimer, the term of this patent is extended or adjusted under 35 U.S.C. 154(b) by 209 days.

(21) Appl. No.: 17/799,413

(22) PCT Filed: Feb. 18, 2021

(86) PCT No.: PCT/GB2021/050398
§ 371 (c)(1),
(2) Date: Aug. 12, 2022

(87) PCT Pub. No.: WO2021/165681
PCT Pub. Date: Aug. 26, 2021

(65) Prior Publication Data
US 2023/0094079 A1    Mar. 30, 2023

(30) Foreign Application Priority Data
Feb. 21, 2020 (GB) .................................... 2002441

(51) Int. Cl.
*G01W 1/14*    (2006.01)
(52) U.S. Cl.
CPC ....................... *G01W 1/14* (2013.01)
(58) Field of Classification Search
CPC ..... G01W 1/14; G01N 15/06; G01N 15/0612; G01N 15/0806; G01N 2015/0846; G01N 2021/558; G01N 2021/4106; G01N 2021/4113; G01N 21/538; G01N 29/32; G01N 29/323; F21V 29/90; B60Q 1/0017; B60Q 1/00; F21S 43/14; F21S 43/145
USPC ....................... 73/170.17, 170.21, 1.57, 1.35
See application file for complete search history.

(56) References Cited

U.S. PATENT DOCUMENTS

| 3,522,858 A | 8/1970 | Christensen |
| 4,335,608 A * | 6/1982 | Wood ........................ G01L 9/16 73/753 |
| 5,886,301 A | 3/1999 | Preble |

(Continued)

FOREIGN PATENT DOCUMENTS

| CN | 208521014 U | 2/2019 |
| JP | S5672314 A | 6/1981 |

(Continued)

OTHER PUBLICATIONS

International Search Report issued for PCT/GB2021/050398, issued Jun. 4, 2021, 4 pages.

(Continued)

*Primary Examiner* — John E Breene
*Assistant Examiner* — Truong D Phan
(74) *Attorney, Agent, or Firm* — Foley & Lardner LLP

(57) ABSTRACT

A system for measuring snowfall comprising: a pressure sensor disposed beneath the surface of an inland body of water located within a region of interest; and a data logger operably connected to the pressure sensor, the data logger being arranged to receive and log data from the pressure sensor.

12 Claims, 4 Drawing Sheets

(56) References Cited

U.S. PATENT DOCUMENTS

| | | | | |
|---|---|---|---|---|
| 2014/0255984 A1* | 9/2014 | Sharpin | ............... | G01N 21/51 |
| | | | | 435/38 |
| 2014/0269181 A1* | 9/2014 | van Borselen | ........... | G01V 1/30 |
| | | | | 367/21 |
| 2016/0169729 A1 | 6/2016 | Kech | | |
| 2019/0107646 A1* | 4/2019 | Trustman | ............... | G01W 1/14 |
| 2019/0383967 A1 | 12/2019 | Polebitski et al. | | |

FOREIGN PATENT DOCUMENTS

| | | | | |
|---|---|---|---|---|
| JP | 2004-309219 A | 11/2004 | | |
| JP | 2018-189507 A | 11/2018 | | |
| KR | 20200095061 A | * 8/2020 | ........... | G06F 16/156 |

OTHER PUBLICATIONS

Pritchard Hamish D. et al "Measuring Changes in Snowpack SWE Continuously on a Landscape Scale Using Lake Water Pressure" Journal of Hydrometeorology, vol. 22, No. 4, Apr. 1, 2021 (Apr. 1, 2021), pp. 795-811.

Search Report issued for UK Patent Application No. GB 2002441.0, issued May 20, 2020, 4 pages.

Written opinion issued for PCT/GB2021/050398, issued Jun. 4, 2021, 7 pages.

* cited by examiner

MEASURING SNOWFALL

CROSS-REFERENCE TO RELATED APPLICATIONS

This application is a U.S. National Phase Application of PCT Application No. PCT/GB2021/050398, filed on Feb. 18, 2021, which claims priority to UK Patent Application No. 2002441.0, filed Feb. 21, 2020. The contents of these applications are incorporated herein by reference in their entirety.

The present disclosure relates to the measurement of snowfall, including a snowfall measurement system and a method of measuring snowfall.

It is useful to measure snowfall for a number of reasons. One reason is that upon melting, the snow and ice provides a source of fresh water. Measurements of snowfall can be used as a basis for estimates of the volume of water that may be produced through melting. The volume of water produced from melted snowfall is known as snow-water-equivalent. This volume of water may be important, e.g. for use in agriculture or as a source of drinking water, and can be given a financial valuation.

The Western USA provides an example of the economic importance of snow-water-equivalent. The economic value of the usable water from the snowpack (which is related to snow-water-equivalent) across this region has been estimated at up to $88 billion per year. To take a smaller area within this region, the value of the usable water from snow (which is related to snow-water-equivalent) in the Puget Sound has been estimated at up to $11.5 billion per year.

It has been observed that the snowpack across the Western USA and elsewhere is shrinking. This may have significant economic consequences. In order to prepare for and/or mitigate such consequences, weather models or climate prediction models may be employed to make forecasts and predictions. However, there is inherent uncertainty within weather models and climate prediction models. If this uncertainty is to be reduced, then reliable, accurate measurements of snowfall are required.

An issue with known snowfall measuring systems, devices and methods is low accuracy. If inaccurate data is then used to estimate the snow-water-equivalent for a region of interest, then the resulting estimate will most likely not be accurate and will be subject to significant uncertainty. This problem may be even more significant (larger errors and/or uncertainty) if the data is being extrapolated to try to make forecasts or predictions.

Obtaining accurate measurements of snowfall is difficult, due to deficiencies in known snowfall measurement systems and techniques.

Known snow gauges, such as heated pluviometers, typically comprise a catchment portion and a container. The catchment portion comprises an open region arranged to catch falling snow and then direct the snow towards the container. Once in the container, the snow may be melted and a volume of water may be stored. In order to melt the contained snow and to prevent snow sticking about the opening to the catchment portion it is typical for such snow gauges to comprise a heating means. Such heating means require a relatively substantial supply of power.

The fact that snow has a tendency to be blown around is a particular problem for such snow gauges. As such the strength and/or direction of wind, and turbulence caused by wind, can affect the snow entering the catchment portion. Typically this will cause such snow gauges to under-catch, and this bias is multiplied when extrapolating the data to estimate snowfall over a larger area.

Due to the small area covered by the catchment portion of the snow gauge, any bias in the results is multiplied by several factors when snow fall over a larger area is estimated by extrapolation.

Each snow gauge provides a point measurement. Snowfall can vary substantially across a region of interest. To obtain a sufficiently large number of point measurements would require an unfeasibly large number of snow gauges to be installed and monitored across the region of interest.

Snow pillows and scales are also known, and typically aim to measure snowfall over an area up to a few square meters. Such devices are relatively difficult and expensive to install and maintain and do not eliminate measurement biases. For example, ice layers forming in the accumulating snowpack above a gauge may act as a bridge and partially support the weight of snow falling above. As such, a less accurate snow-water-equivalent may be calculated.

Further known devices measure snowfall from its effect on radiation. Such devices typically comprise a radiation detector, such as a gamma radiometer or sensors of cosmic rays or global-positioning-system signals, which are relatively expensive to install and maintain. Typically, the signal to noise ratio gets progressively less sensitive as the snow-water-equivalent increases, leading to uncertainty and less precision. Furthermore, such measurement techniques only measure an imperfect proxy for the snow-water-equivalent, and may thus be prone to error and bias.

A first aspect provides a system for measuring snowfall comprising:
 a pressure sensor disposed beneath the surface of an inland body of water located within a region of interest; and
 a data logger operably connected to the pressure sensor, the data logger being arranged to receive and log data from the pressure sensor.

The inland body of water will have a catchment area, i.e. an area of terrain from which water drains into the inland body of water. Use of the system may be particularly advantageous at locations where the catchment area typically may freeze from time to time, e.g. during periods of cold weather, such that during the period(s) when the catchment area is frozen little water drains into the inland body of water from the local terrain. The catchment area typically may freeze seasonally, e.g. on one or more occasions during a typical winter.

In a typical year, the region of interest may experience one or more periods of snowfall, each period of snowfall comprising one or more snowfall events.

Regions of interest may include, for example, mountain ranges, high altitude regions, high plateaux, regions at high degrees of latitude, Arctic or sub-Arctic regions. Examples of possible areas of interest may include the Tibetan plateau, the Alps, the Sierra Nevada (USA), the Rockies, the Andes, the Himalayas and parts of Scandinavia, Siberia or Canada.

The region of interest may have a percentage of total annual precipitation as snowfall above a threshold amount. For instance, the region of interest may have a percentage of total annual precipitation as snowfall of at least 10%, at least 20%, at least 30%, at least 40%, at least 50%, at least 60%, at least 70%, at least 80% or at least 90%.

The system may be considered to measure snowfall on a landscape scale. By measuring snowfall on a landscape scale, more accurate measurements may be obtained, particularly in comparison with point sources of data measured using snow gauges.

During a snowfall event, the mass of the snow falling on to the surface of the inland body of water results in an increase in water pressure, which is measured by the pressure sensor. If the pressure measurements are made during a period when the catchment area is frozen, then the pressure increase measured during a snowfall event may provide a particularly accurate and direct measure of snowfall. Advantageously, the system is arranged such that the pressure sensor measures the pressure increase caused by snowfall over a large area, i.e. an area equal to the surface area of the inland body of water. In this way, the system may be considered to measure snowfall on a landscape scale. By measuring snowfall on a landscape scale, more accurate measurements may be obtained, particularly in comparison with point sources of data measured using snow gauges. For example, use of the system in an inland body of water having a surface area of 11 km$^2$ allows a direct measurement of snowfall over an area approximately 200 million times larger than a typical known snow gauge. Suitable inland bodies of water may be of almost any size. For instance, suitable inland bodies of water may range from ponds with an area of several square metres to large lakes with an area of several square kilometres.

Advantageously, the system comprises only a few components and is therefore a robust system requiring relatively minimal maintenance. Advantageously, the system may be relatively cheap and quick and easy to install.

The inland body of water may comprise a lake, a pond, or the like.

The pressure sensor may be disposed at a substantially fixed location. For example, the pressure sensor may be disposed at a substantially fixed location on a bed of the inland body of water or on a fixed structure within the inland body of water.

By being located at a fixed location beneath the surface of the inland body of water, the pressure sensor may be protected from flowing water and from abrupt temperature changes and/or extreme temperature variations, which may help to extend the service life of the pressure sensor (and hence the system).

The data logger and the pressure sensor may be connected by any suitable wireless or physical connection means. One or more wires or cables may extend from the pressure sensor to the data logger. At least one cable may be suitable for conveying a flow of data.

The data logger may be located at a location remote from the pressure sensor. For example, the data logger may be disposed at a location upon land. The data logger may be located near to or at the perimeter of the inland body of water, such as upon any suitable region of land adjacent to the perimeter of the inland body of water.

The data logger may comprise a memory suitable for storing data. Advantageously, the data logger may be operable to store data received from at least the pressure sensor thus removing the need for measurements to be recorded manually.

The system may comprise a temperature sensor operable to measure the temperature of a portion of land located near to or at the perimeter of the inland body of water. For example, the temperature sensor may comprise a thermometer or a thermistor. A portion of land located near to or at the perimeter of the inland body of water may typically be one of the lowest altitude points of the catchment area of the inland body of water and therefore one of the first areas to rise above 0° C. in when a period of freezing comes to an end. In general, the location of the temperature sensor operable to measure the temperature of a portion of land may be selected to be a location within the region of interest that would typically be one of the first points within the catchment area where the temperature would rise above 0° C. at the end of a period of freezing. Typically, the location may be at a relatively low altitude within the catchment area. Another consideration may be the typical exposure to sunlight of locations within the catchment area. For instance, non-shaded locations may be preferred. Equally, when deploying the system in the Northern hemisphere, a location on a South-facing slope may be preferred over a location on a North-facing slope. The temperature sensor operable to measure the temperature of a portion of land may be disposed on the ground. The temperature sensor operable to measure the temperature of a portion of land may be located at a location where it is liable to be buried by snow. The sensor being buried by snow may be useful, because when the temperature warms to 0° C. during a thaw, it may be indicative of the whole snowpack above being wet (rather than just the surface of the snow). When the whole snowpack is wet, it can then release liquid water that flows downhill into the inland body of water.

Upon the ground temperature reaching and/or rising above 0° C., snow and ice disposed upon the terrain and frozen liquid within the terrain of the catchment area may begin to melt and flow into the inland body of water, which may invalidate a portion of the snowfall measurement. Advantageously, data from the temperature sensor operable to measure the temperature of a portion of land may allow a user of the system to identify when a portion of the pressure data may be invalid. In embodiments, the system may be configured to automatically identify when a portion of the pressure data may be invalid and, optionally, alert a user of this occurrence.

Additionally or alternatively, the system may comprise a temperature sensor operable to measure the water temperature within the inland body of water. The temperature sensor operable to measure the water temperature within (i.e. below the surface of) the inland body of water may comprise, for example, a thermometer or a thermistor. Water temperatures within inland bodies of water typically remain substantially constant over time and only increase or decrease slowly and/or smoothly. An abrupt change in temperature may indicate, for example, an avalanche carrying snow, ice and other debris into the inland body of water, which may invalidate a portion of the snowfall measurement. Advantageously, data from the temperature sensor operable to measure the temperature within the inland body of water allow a user of the system to identify when a portion of the pressure data may be invalid. In embodiments, the system may be configured to automatically identify when a portion of the pressure data may be invalid and, optionally, alert a user of this occurrence.

The data logger may be arranged to receive data from the temperature sensor(s). The data logger may be connected to the temperature sensor(s) by any suitable wireless or physical connection means. One or more cables may extend from the temperature sensor(s) to the data logger, the cables being suitable for conveying a flow of data.

The system may further comprise a transmitter operable to transmit data from the data logger for analysis and/or processing at a location remote from the inland body of water.

For example, the transmitter may comprise a satellite or telephone modem or radio and an antenna. The antenna may be disposed upon a support structure, such as a pole, arranged to secure the antenna at a raised position. Raising the antenna may reduce interference from low level objects such as vegetation, and reduce the risk of the antenna becoming encapsulated by snow. The transmitter may comprise a mobile telecommunications device. The modem may be operable to transmit data via a radio, telephone network or satellite communications device. Advantageously, data may be automatically transmitted to almost any location worldwide. The transmitter may be operable to transmit date periodically (e.g. at regular intervals) or continuously.

The system may comprise a discrete, local power source. The power source may comprise a battery and/or a solar panel. The power source may be connected to the temperature sensor(s), the pressure gauge, the data logger and/or the transmitter via one or more cables or wirelessly.

The system may average a power consumption of less than 1 W, or less than 500 mW, 250 mW or 100 mW. The system may average a power consumption of less than 50 mW.

Conveniently, the system may be operable to run off only the discrete, local power source, since there may be no available means for connection to an electricity grid.

The system may comprise a breather tube, or vent tube, connected to the pressure sensor and arranged to extend through and out of the inland body of water. The breather tube may be arranged such that the pressure gauge can automatically compensate for the changes in atmospheric pressure.

The breather tube may extend upwards from the pressure sensor to a point above the surface of the inland body of water. The breather tube may comprise an elongate tube, pipe, conduit or the like. The breather tube may comprise a first end connected to the pressure gauge and a second end disposed above the surface of the inland body of water. The second end of the breather tube disposed above the surface of the inland body of water may be provided with a means for preventing moisture or liquid entering the breather tube. The breather tube may be arranged such that the pressure gauge can compensate for changes in the atmospheric pressure when disposed, for example, on the bed of the inland body of water. As such, the pressure gauge may be capable of calibrating in line with changes to atmospheric pressure automatically.

Alternatively, changes in atmospheric pressure can be measured independently by a barometric pressure sensor above the surface of the inland water body. Such measurements can be used to compensate for changes in atmospheric pressure should the system be disposed without a breather tube, or vent tube.

The data logger may be arranged to receive data from the barometric pressure sensor(s). The data logger may be connected to the barometric pressure sensor(s) by any suitable wireless or physical connection means. One or more cables may extend from the barometric pressure sensor(s) to the data logger, the cables being suitable for conveying a flow of data.

The system may comprise a data processing device located at a location remote from the inland body of water.

The data processing device may be arranged to analyse and/or process data transmitted thereto so as to calculate, for example, an estimated snow-water-equivalent for the region of interest.

The snowfall measurement data and/or one or more results of the data analysis and/or processing carried out by the data processing device may be utilised as an input for a weather model or a climate prediction model. The weather model or the climate prediction model may be designed to forecast or predict future weather conditions or climate conditions for the region of interest. The snowfall measurement data and/or the one or more results of the data analysis and/or processing carried out by the data processing device may be utilised to train a weather model or a climate prediction model.

Snowfall measurement data obtained using a system disclosed herein typically may be much more accurate than data obtained using snow gauges or the like (i.e. smaller point sources). Accordingly, the use of such data in weather models or climate prediction models may help to generate forecasts or predictions having less uncertainty.

One or more time series of data obtained using a system and/or method disclosed herein may be utilised as an input for a weather model or a climate prediction model.

One or more of the time series may include a historical data set.

The system may comprise at least two pressure sensors.

For example, the system may comprise: a first pressure sensor disposed beneath the surface of a first inland body of water located within a region of interest; and one or more further pressure sensors, each further pressure sensor being disposed beneath the surface of a further inland body of water. The or each further inland body of water may be located within the same or a different region of interest as the first inland body of water.

Each further pressure sensor may be connected to a discrete data logger. Alternatively, one or more of the first pressure sensor and the further pressure sensor(s) may be connected to a common data logger.

For a region of interest comprising a plurality of suitable inland bodies of water, the system may be arranged to provide data from any number of the inland bodies of water. It may be that more accurate or thorough measurement data are obtained for a given region of interest using a system that is arranged to provide data from a plurality of inland bodies of water within the region of interest, since the total (water) surface area of the inland bodies of water may be increased or even maximised.

Additionally or alternatively, the system may be arranged such that data from more than one region of interest is transmitted to a common data processing device located at a location remote from any of the inland bodies of water.

A second aspect provides a method of measuring snowfall comprising:
  measuring the absolute water pressure at a point beneath the surface of an inland body of water located within a region of interest; and
  logging the measured water pressure over a period of time.

The method may comprise: using the logged data to calculate the mass of snowfall upon the surface of the inland body of water for the period of time.

The method may comprise: analysing and/or processing the logged data, in order, for example, to calculate a snow-water-equivalent for the region of interest.

The method may comprise: transmitting the logged data to a data processing device at a location remote from the inland body of water.

The method may be performed using a system according to the first aspect. Therefore, a pressure sensor disposed beneath the surface of the inland body of water may be employed to measure the absolute water pressure. The measured water pressure may be logged by a data logger operably connected to the pressure sensor, the data logger being arranged to receive and log data from the pressure sensor.

The method may comprise a step of storing pressure data on the data logger for a period of time.

The method may comprise calculating a rate of drainage from the inland body of water. The rate of drainage may be calculated using data recorded from the pressure gauge during one or more periods comprising no or negligible periods of snowfall. The decrease in pressure during such periods may be equated directly to the mass of water draining from the inland body of water.

The method may comprise calculating a rate of drainage prior to and following a snowfall event. The rate of drainage may be calculated using data recorded from the pressure gauge during a period comprising no snowfall following a period of snowfall. As such, any difference in drainage rate following a snowfall event may be calculated.

The method may comprise calculating the drainage rate, e.g. hourly drainage rate, during a snowfall event based on the calculated drainage rate prior to and following the snowfall event. In this way, a rate of change in pressure due to water draining from the inland body of water throughout the snowfall event can be calculated. As such, values corresponding to a change in water pressure caused by snowfall and values corresponding to a change in water pressure caused by water draining from the inland body of water may be calculated separately.

The drainage rate prior to and following a given snowfall event may be calculated based on the pressure gradient over a time period before the given snowfall event and the pressure gradient over a time period following the given snowfall event. The time period may be any suitable duration, such as, an hour, several hours, 12 hours, 24 hours, 36 hours or 48 hours, for example.

For example, the difference between the pressure gradients prior to and following a given snowfall event may be divided by the total pressure change during the given snowfall event to calculate the sensitivity of the drainage rate to changes in the water pressure. The change in pressure gradient may be integrated through time to calculate the change in pressure as a result of drainage for any given time during the snowfall event.

There may be an uncertainty in the drainage rate(s). For instance, the uncertainty in the drainage rate(s) may be calculated using regression statistics that include the standard errors of the pressure gradients, the standard errors of their y-estimates and the instrumental uncertainty in the pressure measurements, combined in quadrature.

There may be a total uncertainty in the snow water equivalent at a given time. In some embodiments, calculating the total uncertainty in the snow water equivalent at a given time may comprise combining in quadrature the uncertainty in the drainage rate with the instrumental uncertainty and the uncertainty in the average pressure calculated for a given time.

Advantageously, the net mass of snowfall may be more accurately measured.

The method may comprise measuring the temperature of a region of land near to or at the perimeter of the inland body of water. A portion of land located near to or at the perimeter of the inland body of water may typically be one of the lowest points of the inland body of water catchment and therefore one of the first areas to rise above 0° C. in circumstances of increasing temperatures.

If the temperature of a region of land near to or at the perimeter of the inland body of water rises above 0° C., the method may comprise a step comprising an indication that a portion of the snowfall data may be invalid. If regions of land adjacent to the inland body of water reach 0° C. or above, liquid water may also enter the inland body of water in addition to any precipitation directly landing upon the surface. The indication may be presented in a visual form by the data processing device.

The method may comprise measuring the temperature of the water within the inland body of water. An abrupt change in temperature may indicate, for example, an avalanche carrying snow, ice and other debris into the inland body of water, which may invalidate a portion of the snowfall measurements. The method may comprise a step comprising generating an indication that a portion of the snowfall data may be invalid due to an avalanche carrying snow, ice and other debris into the inland body of water from adjacent areas of land. The indication may be presented in any suitable form by the data processing device.

The inland body of water will have a catchment area, i.e. an area of terrain from which water drains into the inland body of water. Use of the method may be particularly advantageous at locations where the catchment area typically may freeze from time to time, e.g. during periods of cold weather, such that during the period(s) when the catchment area is frozen substantially little water drains into the inland body of water from the local terrain. The catchment area typically may freeze seasonally, e.g. on one or more occasions during a typical winter.

In a typical year, the region of interest may experience one or more periods of snowfall, each period of snowfall comprising one or more snowfall events.

Regions of interest may include, for example, mountain ranges, high altitude regions, high plateaus, regions at high degrees of latitude, Arctic or sub-Arctic regions. Examples of possible areas of interest may include the Tibetan plateau, the Alps, the Sierra Nevada (USA), the Rockies, the Andes, the Himalayas and parts of Scandinavia, Siberia or Canada.

The region of interest may have a percentage of total annual precipitation as snowfall above a threshold amount. For instance, the region of interest may have a percentage of total annual precipitation as snowfall of at least 10%, at least 20%, at least 30%, at least 40%, at least 50%, at least 60%, at least 70%, at least 80% or at least 90%.

The method may be considered to measure snowfall on a landscape scale. By measuring snowfall on a landscape scale, more accurate measurements may be obtained, particularly in comparison with methods that employ point sources of data, e.g. measured using snow gauges.

During a snowfall event, the mass of the snow falling on to the surface of the inland body of water results in an increase in water pressure, which is measured by the pressure sensor. If the pressure measurements are made during a period when the catchment area is frozen, then the pressure increase measured during a snowfall event may provide a particularly accurate and direct measure of snowfall. Advantageously, the method measures the pressure increase caused by snowfall over a large area, i.e. an area equal to the surface area of the inland body of water. In this way, the method may be considered to measure snowfall on a landscape scale. By measuring snowfall on a landscape scale, more accurate measurements may be obtained, particularly in comparison with point sources of data measured using snow gauges. For example, use of the method to measure at an inland body of water having a surface area of 11 $km^2$ allows a direct measurement of snowfall over an area approximately 200 million times larger than a typical known snow gauge. Suitable inland bodies of water may be of almost any size. For instance, suitable inland bodies of water may range from ponds with an area of several square metres to large lakes with an area of several square kilometres.

The start and end points of a snowfall event may be measured based on changes in the pressure measurements, such as, changes in the pressure gradient (the first derivative of pressure with respect to time), and/or changes in the rate of change of the pressure gradient (the second derivative of pressure with respect to time), for example.

Advantageously, the method may be performed using a system comprising only a few components. The system may therefore be relatively robust and/or may require relatively minimal maintenance.

The method may comprise a preliminary step of installing one or more systems according to the present disclosure.

The inland body of water may comprise a lake, a pond, or the like.

The pressure sensor may be disposed at a substantially fixed location. For example, the pressure sensor may be disposed at a substantially fixed location on a bed of the inland body of water or on a fixed structure within the inland body of water.

By being located at a fixed location beneath the surface of the inland body of water, the pressure sensor may be protected from flowing water and from abrupt temperature changes and/or extreme temperature variations, which may help to extend the service life of the pressure sensor (and hence the system).

The data logger and the pressure sensor may be connected by any suitable wireless or physical connection means. One or more wires or cables may extend from the pressure sensor to the data logger. At least one cable may be suitable for conveying a flow of data.

The data logger may be located at a location remote from the pressure sensor. For example, the data logger may be disposed at a location upon land. The data logger may be located near to or at the perimeter of the inland body of water, such as upon any suitable region of land adjacent to the perimeter of the inland body of water.

The data logger may comprise a memory suitable for storing data. Advantageously, the data logger may be operable to store data received from at least the pressure sensor thus removing the need for measurements to be recorded manually.

The system may comprise a temperature sensor operable to measure the temperature of a portion of land located near to or at the perimeter of the inland body of water. For example, the temperature sensor may comprise a thermometer or a thermistor. A portion of land located near to or at the perimeter of the inland body of water may typically be one of the lowest altitude points of the catchment area of the inland body of water and therefore one of the first areas to rise above 0° C. in when a period of freezing comes to an end. In general, the location of the temperature sensor operable to measure the temperature of a portion of land may be selected to be a location within the region of interest that would typically be one of the first points within the catchment area where the temperature would rise above 0° C. at the end of a period of freezing. Typically, the location may be at a relatively low altitude within the catchment area. Another consideration may be the typical exposure to sunlight of locations within the catchment area. For instance, non-shaded locations may be preferred. Equally, when deploying the system in the Northern hemisphere, a location on a South-facing slope may be preferred over a location on a North-facing slope. The temperature sensor operable to measure the temperature of a portion of land may be disposed on the ground. The temperature sensor operable to measure the temperature of a portion of land may be located at a location where it is liable to be buried by snow. The sensor being buried by snow may be useful, because when the temperature warms to 0° C. during a thaw, it may be indicative of the whole snowpack above being wet (rather than just the surface of the snow). When the whole snowpack is wet, it can then release liquid water that flows downhill into the inland body of water.

Upon the ground temperature reaching and/or rising above 0° C., snow and ice disposed upon the terrain and frozen liquid within the terrain of the catchment area may begin to melt and flow into the inland body of water, which may invalidate a portion of the snowfall measurement. Advantageously, data from the temperature sensor operable to measure the temperature of a portion of land may allow a user of the system to identify when a portion of the pressure data may be invalid. In embodiments, the system may be configured to automatically identify when a portion of the pressure data may be invalid and, optionally, alert a user of this occurrence.

In some embodiments, the system may be configured to automatically identify when a portion of the pressure data may be invalid and exclude, remove, separate or delete the relevant data set.

Additionally or alternatively, the system may comprise a temperature sensor operable to measure the water temperature within the inland body of water. The temperature sensor operable to measure the water temperature within (i.e. below the surface of) the inland body of water may comprise, for example, a thermometer or a thermistor. Water temperatures within inland bodies of water typically remain substantially constant over time and only increase or decrease slowly and/or smoothly. An abrupt change in temperature may indicate, for example, an avalanche carrying snow, ice and other debris into the inland body of water, which may invalidate a portion of the snowfall measurement. Advantageously, data from the temperature sensor operable to measure the temperature within the inland body of water allow a user of the system to identify when a portion of the pressure data may be invalid. In embodiments, the system may be configured to automatically identify when a portion of the pressure data may be invalid and, optionally, alert a user of this occurrence.

In some embodiments, the system may be configured to automatically identify when a portion of the pressure data may be invalid and exclude, remove, separate or delete the relevant data set.

The data logger may be arranged to receive data from the temperature sensor(s). The data logger may be connected to the temperature sensor(s) by any suitable wireless or physical connection means. One or more cables may extend from the temperature sensor(s) to the data logger, the cables being suitable for conveying a flow of data.

The system may further comprise a transmitter operable to transmit data from the data logger for analysis and/or processing at a location remote from the inland body of water.

For example, the transmitter may comprise a satellite or telephone modem or radio and an antenna. The antenna may be disposed upon a support structure, such as a pole, arranged to secure the antenna at a raised position. Raising the antenna may reduce interference from low level objects such as vegetation, and reduce the risk of the antenna becoming encapsulated by snow. The transmitter may comprise a mobile telecommunications device. The modem may be operable to transmit data via a radio, telephone network or satellite communications device. Advantageously, data may be automatically transmitted to almost any location worldwide. The transmitter may be operable to transmit date periodically (e.g. at regular intervals) or continuously.

The system may comprise a discrete, local power source. The power source may comprise a battery and/or a solar panel. The power source may be connected to the temperature sensor(s), the pressure gauge, the data logger and/or the transmitter via one or more cables or wirelessly.

The system may average a power consumption of less than 1 W, or less than 500 mW, 250 mW or 100 mW. The system may average a power consumption of less than 50 mW.

Conveniently, the system may be operable to run off only the discrete, local power source, since there may be no available means for connection to an electricity grid.

The system may comprise a breather tube, or vent tube, connected to the pressure sensor and arranged to extend through and out of the inland body of water. The breather tube may be arranged such that the pressure gauge can automatically compensate for the changes in atmospheric pressure.

The breather tube may extend upwards from the pressure sensor to a point above the surface of the inland body of water. The breather tube may comprise an elongate tube, pipe, conduit or the like. The breather tube may comprise a first end connected to the pressure gauge and a second end disposed above the surface of the inland body of water. The second end of the breather tube disposed above the surface of the inland body of water may be provided with a means for preventing moisture or liquid entering the breather tube. The breather tube may be arranged such that the pressure gauge can compensate for changes in the atmospheric pressure when disposed, for example, on the bed of the inland body of water. Consequently, the pressure gauge may be capable of calibrating in line with changes to atmospheric pressure automatically. Alternatively, changes in atmospheric pressure can be measured independently by a barometric pressure sensor above the surface of the inland water body. Such measurements can be used to compensate for changes in atmospheric pressure should the system be disposed without a breather tube, or vent tube.

The data logger may be arranged to receive data from the barometric pressure sensor(s). The data logger may be connected to the barometric pressure sensor(s) by any suitable wireless or physical connection means. One or more cables may extend from the barometric pressure sensor(s) to the data logger, the cables being suitable for conveying a flow of data.

The system may comprise a data processing device located at a location remote from the inland body of water.

The data processing device may be arranged to analyse and/or process data transmitted thereto so as to calculate, for example, an estimated snow-water-equivalent for the region of interest.

The snowfall measurement data and/or one or more results of the data analysis and/or processing carried out by the data processing device may be utilised as an input for a weather model or a climate prediction model. The weather model or the climate prediction model may be designed to forecast or predict future weather conditions or climate conditions for the region of interest. The snowfall measurement data and/or the one or more results of the data analysis and/or processing carried out by the data processing device may be utilised to train a weather model or a climate prediction model.

Snowfall measurement data obtained using a system disclosed herein typically may be much more accurate than data obtained using snow gauges or the like (i.e. smaller point sources). Accordingly, the use of such data in weather models or climate prediction models may help to generate forecasts or predictions having less uncertainty.

One or more time series of data obtained using a system and/or method disclosed herein may be utilised as an input for a weather model or a climate prediction model.

One or more of the time series may include a historical data set.

The system may comprise at least two pressure sensors. For example, the system may comprise a first pressure sensor disposed beneath the surface of a first inland body of water located within a region of interest; and one or more further pressure sensors, each further pressure sensor being disposed beneath the surface of a further inland body of water. The or each further inland body of water may be located within the same or a different region of interest as the first inland body of water.

Each further pressure sensor may be connected to a discrete data logger. Alternatively, one or more of the first pressure sensor and the further pressure sensor(s) may be connected to a common data logger.

For a region of interest comprising a plurality of suitable inland bodies of water, the method may be employed to provide data from any number of the inland bodies of water. It may be that more accurate or thorough measurement data are obtained for a given region of interest using a method providing data from a plurality of inland bodies of water within the region of interest, since the total (water) surface area of the inland bodies of water may be increased or even maximised.

Additionally or alternatively, data from more than one region of interest may be recorded, analysed and/or processed in accordance with a method described herein. For instance, date from more than one region of interest may be transmitted to a common data processing device located at a location remote from any of the inland bodies of water.

Another aspect provides use of snowfall measurement data and/or one or more results of analysis and/or processing carried out on the snowfall measurement data obtained using a system according to the present disclosure as an input for a weather model or a climate prediction model.

The weather model or the climate prediction model may be designed to forecast or predict future weather or climate conditions for the region(s) of interest.

The snowfall measurement data and/or one or more results of analysis and/or processing carried out on the snowfall measurement data may be utilised to train the weather model or the climate prediction model.

One or more time series of the snowfall measurement data and/or one or more results of analysis and/or processing carried out on the snowfall measurement data may be utilised as the input for the weather model or the climate prediction model.

One or more of the time series may include a historical data set.

Another aspect provides use of snowfall measurement data and/or one or more results of analysis and/or processing carried out on the snowfall measurement data obtained by a method according to the present disclosure as an input for a weather model or a climate prediction model.

The weather model or the climate prediction model may be designed to forecast or predict future weather or climate conditions for the region(s) of interest.

The snowfall measurement data and/or one or more results of analysis and/or processing carried out on the snowfall measurement data may be utilised to train the weather model or the climate prediction model.

One or more time series of the snowfall measurement data and/or one or more results of analysis and/or processing carried out on the snowfall measurement data may be utilised as the input for the weather model or the climate prediction model.

One or more of the time series may include a historical data set.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only with reference to the accompanying drawings in which.

Figure 1:
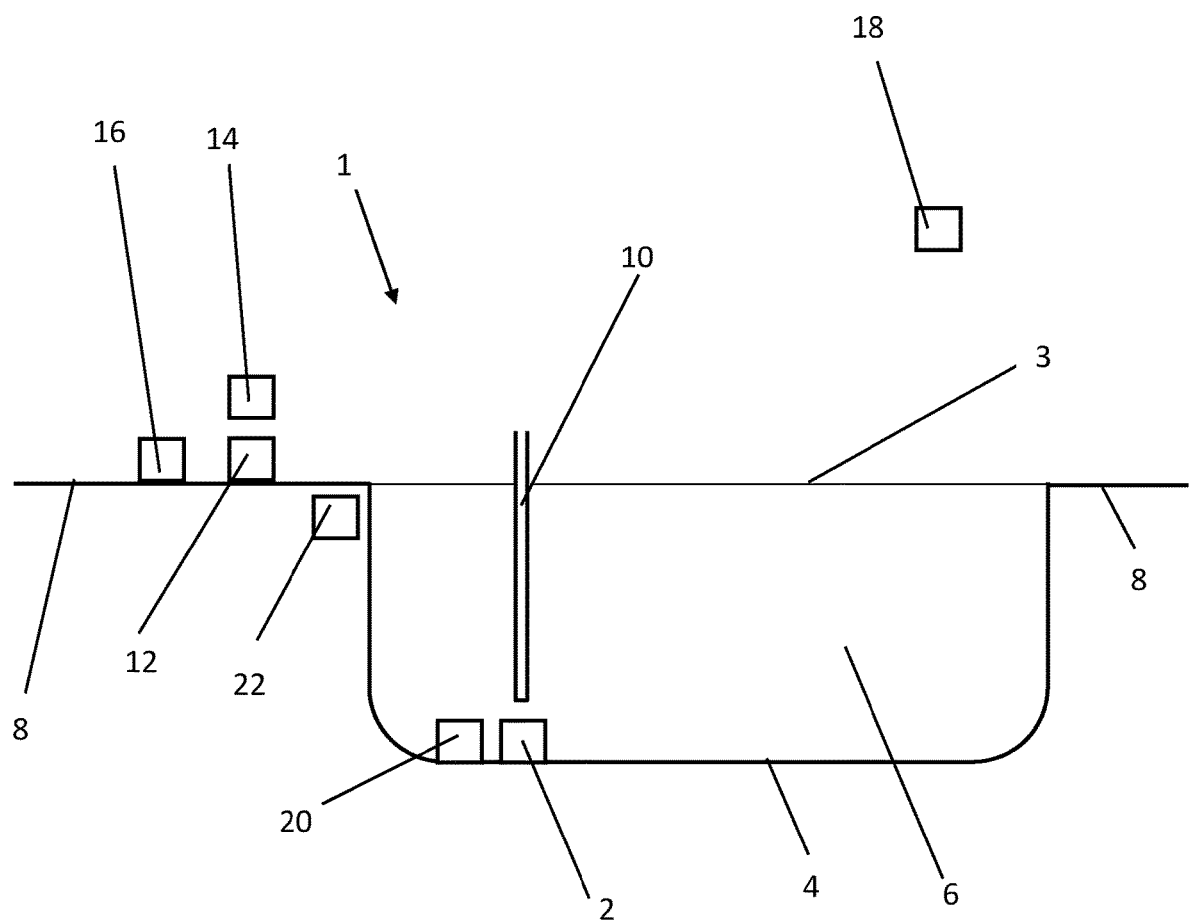
FIG. 1 shows an example system for measuring snowfall.

Referring to FIG. 1, a system 1 for measuring snowfall comprises a pressure sensor 2 located on a bed 4 of an inland body of water 6. The inland body of water 6 is located within a region of interest for measuring snowfall. The inland body of water 6 comprises a substantially non-flowing body of water. In some embodiments the inland body of water 6 comprises a lake, a pond, a reservoir or the like. The inland body of water 6 has a surface 3 and is bounded by land 8. The inland body of water 6 has a catchment area that typically freezes from time to time.

The pressure gauge 2 is operable to measure the water pressure exerted upon it. A cable (not shown) forms a connection between the pressure gauge 2 and a data logger 12 and is suitable for conveying data from the pressure gauge 2 to the data logger 12. The cable comprises any suitable data transmission cable. The pressure gauge 2 is operable to measure the water pressure exerted on it at pre-determined intervals. The data logger 12 comprises a memory and the water pressure data is transmitted to and stored by the data logger 12.

A breather tube 10 extends upwards from the pressure sensor 2 to a point above the surface 3 of the inland body of water 6. The breather tube 10 comprises an elongate tube, pipe, conduit or the like. The breather tube 10 comprises a first end connected to the pressure gauge 2 and a second end disposed above the surface of the inland body of water 6. The second end of the breather tube 10 disposed above the surface of the inland body of water 6 is provided with a means for preventing moisture or liquid 24 entering the breather tube 10. The breather tube 10 is arranged such that the pressure gauge 2 can record the atmospheric pressure when disposed on the bed 4 of the inland body of water 6. As such, the pressure gauge 2 can be arranged to calibrate in line with changes to atmospheric pressure automatically.

A water temperature sensor 20 is located near to the pressure sensor 2.

The data logger 12 is located on the land 8 bounding the inland body of water 6. The pressure sensor 2 and the water temperature sensor 20 are operably connected to the data logger 12. The data logger 12 receives, in use, data from the pressure sensor 2 and the water temperature sensor 20.

The system 1 further comprises a land temperature sensor 22 located on the land 8 close to an edge of the inland body of water 6. The land temperature sensor 22 is operably connected to the data logger 12. The data logger 12 receives, in use, data from the land temperature sensor 22.

The system 1 further comprises a water temperature sensor 20. The water temperature sensor 20 is operable to measure the temperature of the surrounding water within the inland body of water 6. The water temperature sensor 20 is arranged such that data may be transmitted from the water temperature sensor 20 to the data logger 12.

The system 1 further comprises a discrete, local power supply 14 operable to provide power for a transmitter 16, the data logger 12, the land temperature sensor 22, the pressure sensor 2 and the water temperature sensor 20.

The provision of a discrete, local power supply may be advantageous, since the inland body of water may be located in a relatively inaccessible location that is not connected to an electricity grid. In embodiments, the local power supply may comprise a solar panel and/or a battery.

The transmitter 16 is located near, and operably connected to, the data logger 12. The transmitter 16 is operable to transmit data wirelessly from the data logger 12 to a data processing device 18 located remotely from the inland body of water 6.

The transmitter 16 is connected to the power supply 14 such that the power supply 14 is operable to supply electricity to the transmitter 16. The transmitter 16 is connected to the data logger 12 such that data may be conveyed from the data logger 12 to the transmitter 16.

The transmitter 16 is configured to send data to the remote data processing device 18 intermittently. In some embodiments the time interval between data transfers is pre-determined. In some embodiments the time interval between data transfers may be approximately four hours. Alternatively, the transmitter 16 may be configured to send data continuously to the remote data processing device 18.

In some embodiments, the transmitter 16 may comprise a satellite modem and an antenna. The satellite modem may be operable to send data to the remote data processing device via a communications satellite.

The remote data processing device 18 comprises a memory operable to store the water pressure data. The remote data processing device 18 also comprises a microprocessor operable to process and/or analyse the water pressure data.

The data processing device 18 may be arranged to analyse and/or process data transmitted thereto so as to calculate, for example, an estimated snow-water-equivalent for the region of interest.

The snowfall measurement data and/or one or more results of the data analysis and/or processing carried out by the data processing device 18 may be utilised as an input for a weather model or a climate prediction model. The weather model or the climate prediction model may be designed to forecast or predict future weather conditions or climate conditions for the region of interest. The snowfall measurement data and/or the one or more results of the data analysis and/or processing carried out by the data processing device 18 may be utilised to train a weather model or a climate prediction model.

Snowfall measurement data obtained using a system disclosed herein typically may be much more accurate than data obtained using snow gauges or the like (i.e. smaller point sources). Accordingly, the use of such data in weather models or climate prediction models may help to generate forecasts or predictions having less uncertainty.

One or more time series of data obtained using a system, e.g. the system of FIG. 1, and/or method disclosed herein may be utilised as an input for a weather model or a climate prediction model.

One or more of the time series may include a historical data set.

In embodiments, the system may comprise at least two pressure sensors.

For example, the system may comprise a first pressure sensor disposed beneath the surface of a first inland body of water located within a region of interest; and one or more further pressure sensors, each further pressure sensor being disposed beneath the surface of a further inland body of water. The or each further inland body of water may be located within the same or a different region of interest as the first inland body of water.

Each further pressure sensor may be connected to a discrete data logger. Alternatively, one or more of the first pressure sensor and the further pressure sensor(s) may be connected to a common data logger.

For a region of interest comprising a plurality of suitable inland bodies of water, the system may be arranged to provide data from any number of the inland bodies of water. It may be that more accurate or thorough measurement data are obtained for a given region of interest using a system that is arranged to provide data from a plurality of inland bodies of water within the region of interest, since the total (water) surface area of the inland bodies of water may be increased or even maximised.

Additionally or alternatively, the system may be arranged such that data from more than one region of interest is transmitted to a common data processing device located at a location remote from any of the inland bodies of water.

Figure 2:
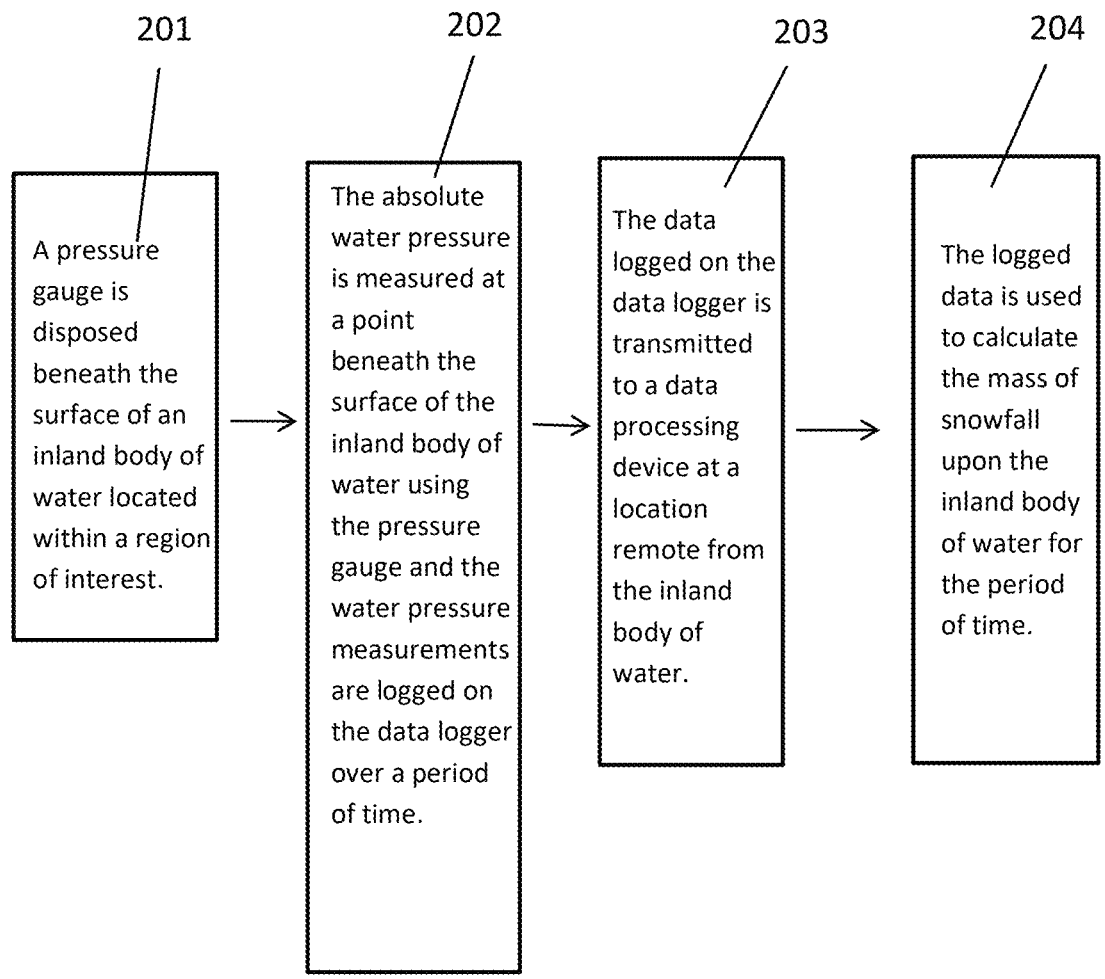
FIG. 2 is a flowchart of a method for measuring snowfall using the system of FIG. 1.

FIG. 2 illustrates a method of measuring snowfall, which may, for example, be performed using a system disclosed herein such as the system of FIG. 1.

In a first step 201, a pressure gauge is disposed beneath the surface of an inland body of water located within a region of interest, the pressure gauge being operably connected to a data logger arranged to receive and log data from the pressure sensor.

In a second step 202, the absolute water pressure is measured at a point beneath the surface of the inland body of water using the pressure gauge and the water pressure measurements are logged on the data logger over a period of time. A catchment area for the inland body of water may be frozen for at least a portion of the period of time.

In a third step 203, the data logged on the data logger is transmitted to a data processing device at a location remote from the inland body of water. The third step 203 may be omitted, in which case the data logged on the data logger may be retrieved after the period of time.

In a fourth step 204, the logged data is used to calculate the mass of snowfall upon the inland body of water for the period of time. The logged data may be analysed and/or processed, in order, for example, to calculate a snow-water-equivalent for the region of interest.

In an optional further step, the logged data and/or one or more results of the data analysis and/or processing may be utilised as an input for a weather model or a climate prediction model.

The method may comprise calculating a rate of drainage from the inland body of water. The rate of drainage may be calculated using data recorded from the pressure gauge during one or more periods comprising no or negligible periods of snowfall. The decrease in pressure during such periods may be equated directly to the mass of water draining from the inland body of water.

The method may comprise calculating a rate of drainage from the inland body of water prior to and following a snowfall event. The rate of drainage may be calculated using data recorded from the pressure gauge during a period comprising no snowfall following a period of snowfall. As such, any difference in drainage rate following a snowfall event may be calculated.

The method may comprise calculating the drainage rate, e.g. hourly drainage rate, during a snowfall event based on the calculated drainage rate prior to and following the snowfall event. In this way, a rate of change in pressure due to water draining from the inland body of water throughout the snowfall event can be calculated. As such, values corresponding to a change in water pressure caused by snowfall and values corresponding to a change in water pressure caused by water draining from the inland body of water may be calculated separately.

The method may comprise measuring the temperature of a region of land near to or at the perimeter of the inland body of water. A portion of land located near to or at the perimeter of the inland body of water may typically be one of the lowest points of the inland body of water catchment and therefore one of the first areas to rise above 0° C. in circumstances of increasing temperatures.

If the temperature of a region of land near to or at the perimeter of the inland body of water rises above 0° C., the method may comprise a step comprising an indication that a portion of the snowfall data may be invalid. If regions of land adjacent to the inland body of water reach 0° C. or above, liquid water may also enter the inland body of water in addition to any precipitation directly landing upon the surface. The indication may be presented in a visual form by the data processing device.

The method may comprise measuring the temperature of the water within the inland body of water. An abrupt change in temperature may indicate, for example, an avalanche carrying snow, ice and other debris into the inland body of water, which may invalidate a portion of the snowfall measurements. The method may comprise a step comprising generating an indication that a portion of the snowfall data may be invalid due to an avalanche carrying snow, ice and other debris into the inland body of water from adjacent areas of land. The indication may be presented in any suitable form by the data processing device.

The inland body of water will have a catchment area, i.e. an area of terrain from which water drains into the inland body of water. Use of the method may be particularly advantageous at locations where the catchment area typically may freeze from time to time, e.g. during periods of cold weather, such that during the period(s) when the catchment area is frozen substantially no water drains into the inland body of water from the local terrain. The catchment area typically may freeze seasonally, e.g. on one or more occasions during a typical winter.

Figure 3:
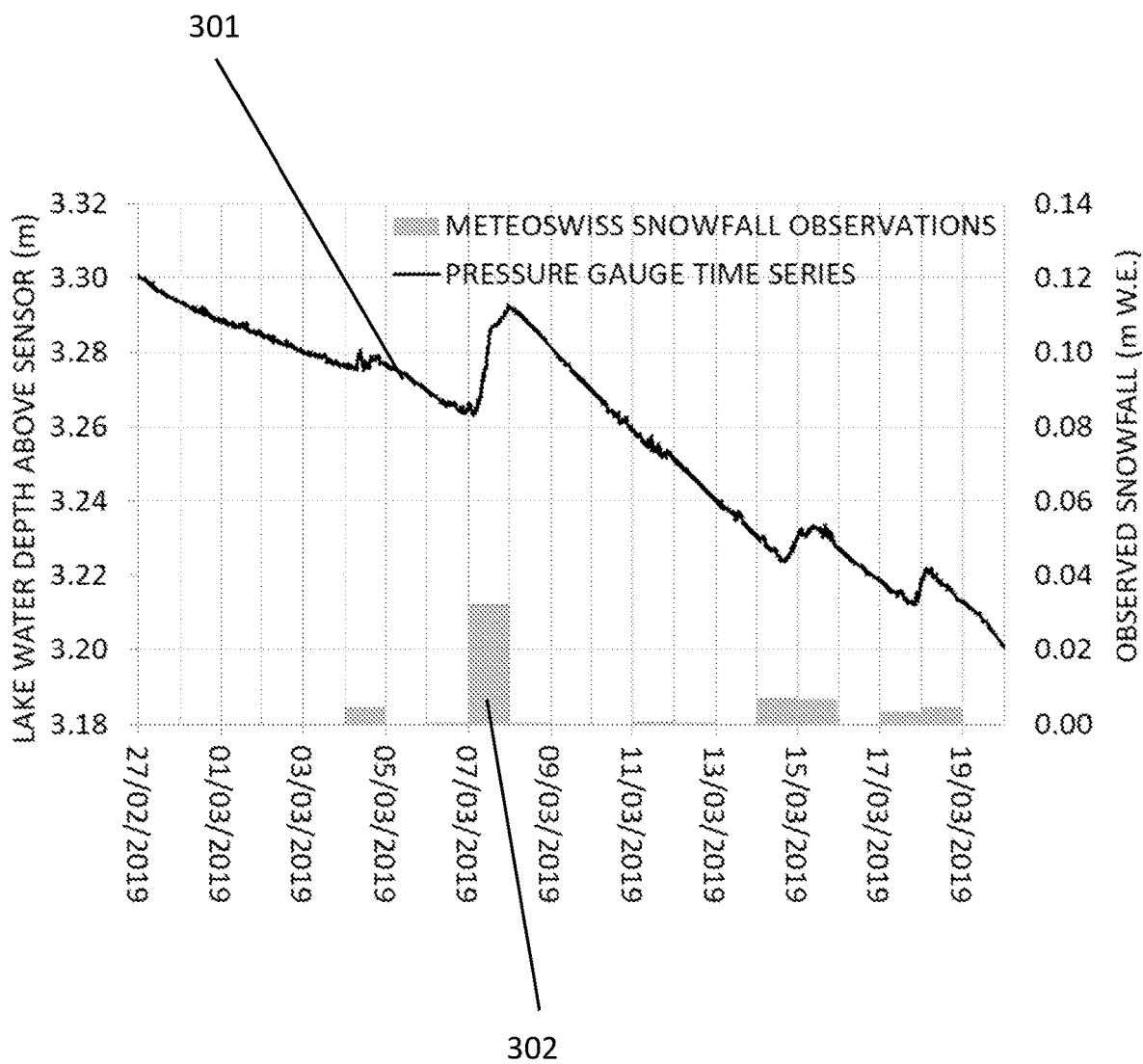
FIG. 3 shows a graph comparing snowfall data recorded by the Swiss Federal Office of Meteorology and Climatology (Meteoswiss) and data recorded by a pressure sensor disposed beneath the surface of a lake.

FIG. 3 is a graph comparing snowfall measurements obtained using a system according to the present disclosure with official snowfall observations made by a national weather service.

The system comprised a pressure sensor disposed beneath the surface of a lake in the Swiss Alps and a data logger operably connected to the pressure sensor. The data logger received and logged the measured water pressure over a period of time during which the catchment area for the lake was frozen. The logged water pressure measurements were retrieved, and subsequently analysed and processed, at the end of the period of time.

In FIG. 3, comparative data for a period of around three weeks are shown. Time, measured in days is plotted on the x-axis. Lake water depth above the sensor, measured in metres, is plotted on the left-hand y-axis. Lake water depth above the sensor correlates with absolute water pressure. Observed snowfall (i.e. official snowfall observations made by the Meteoswiss weather service), measured in metre water equivalent (m w.e.), is plotted on the right-hand y-axis.

Data recorded by the system, i.e. the lake water depth above sensor data for the period of time, is shown by a line 301. Official observed snowfall data from a known snow gauge is shown in a series of bars 302, each bar 302 constituting a snowfall event.

As shown in FIG. 3, positive gradients in the line 301 (i.e. lake pressure data) correspond to the bars 302 (i.e. occurrences of officially observed snowfall events). Accordingly, the principle of using pressure data from an inland body of water to measure snowfall on a landscape scale within a region of interest would appear to be validated.

Figure 4:
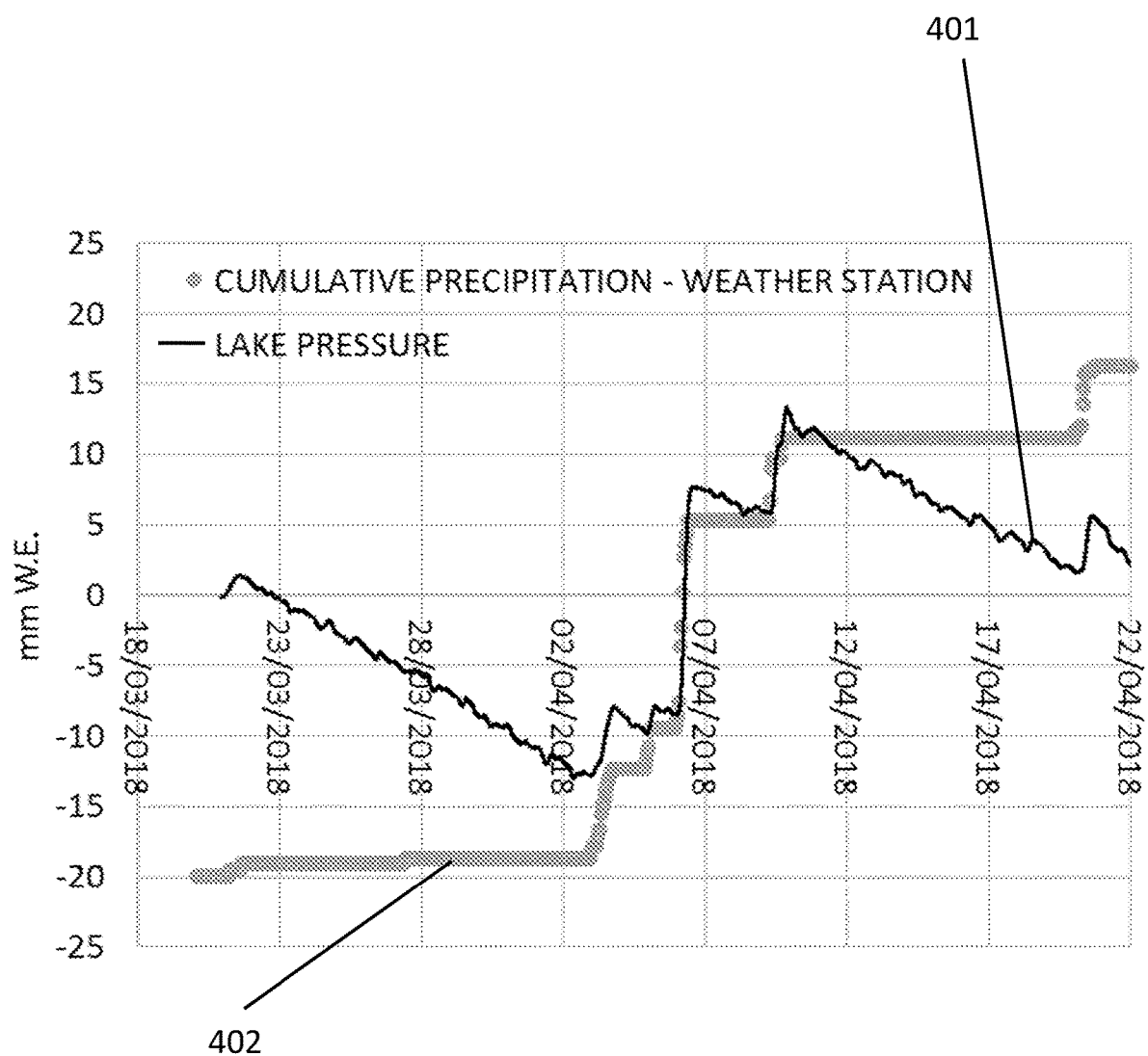
FIG. 4 shows a graph comparing snowfall data recorded by a weather station and data recorded by a pressure sensor disposed beneath the surface of a lake.

FIG. 4 is a graph comparing snowfall measurements obtained using a system according to the present disclosure with official snowfall observations made by a weather station near the inland body of water.

The system comprised a pressure sensor disposed beneath the surface of a lake in an Arctic region of Scandinavia and a data logger operably connected to the pressure sensor. The data logger received and logged the measured water pressure over a period of time during which the catchment area for the lake was frozen. The logged water pressure measurements were retrieved, and subsequently analysed and processed, at the end of the period of time.

In FIG. 4, comparative data for a period of around one month are shown. Time, measured in days is plotted on the x-axis. Observed snowfall (i.e. snowfall observations made by the weather station), measured in millimetre water equivalent (mm w.e.), is plotted on the y-axis. A first line 402 indicates the cumulative precipitation measured by the weather station during period. Sharp increases in the gradient of the first line 402 correlate with snowfall events.

A second line 401 is shown on FIG. 3, which represents the pressure measurements obtained by the system during the period of time.

It can be seen, for example, that, during periods of minimal or no snowfall, indicated by substantially horizontal sections of the first line 402, the second line 401 has a negative gradient. This may be representative of water draining from the lake. During periods of snowfall, indicated by a positive gradient in the first line 402, the second line 401 also has a positive gradient.

A further example implementation of the disclosure will now be described.

Calculating the snow water equivalent of a snowfall event in accordance with this disclosure may involve measuring the water-pressure change that happened during the snowfall event, and making a correction for the calculated pressure change that happened at the same time due to drainage of water into or out of the inland body of water, e.g. lake. For example, a lake may lose 10 mm of water in a day due to drainage, while at the same time gaining 30 mm of water equivalent from snowfall. This would give a measured total pressure change of +20 mm of water equivalent over that day. To find the true snowfall amount of 30 mm water equivalent in this example, it is necessary to calculate how much was lost to drainage (10 mm), and add it to the observed pressure change of 20 mm.

In an example implementation, this process may include performing the following steps on the datasets from the pressure and temperature sensors:
  1) exclude those parts of the water-pressure dataset where snow may be melting:
  2) detect the start and end points of each snowfall event from the water-pressure data:
  3) calculate the water-pressure change due to lake drainage during each snowfall event:
  4) add the measured water-pressure change since the start of the snowfall event to the calculated change due to drainage to give the snow water equivalent due to snowfall; and
  5) calculate the uncertainties in the snow water equivalent.

One or more of these steps may be automated using a computer program that reads in the datasets from the pressure and temperature sensors. For instance, all of these steps may be automated using a computer program that reads in the datasets from the pressure and temperature sensors.

The inventor has realised that snowfall causes a change in lake water-pressure through time that can be measured using the systems and methods disclosed herein. When snow lying on the ground adjacent to the lake melts, the water it produces can flow into the lake and produce a similar pressure signal. These periods in step (1) may be excluded using measurements from one or more temperature sensors that are positioned to detect a thaw.

In step (2), the start and end points of a snowfall event may be detected from any combination of: changes in water-pressure, changes in the pressure gradient (the first derivative of pressure with respect to time), and/or changes in the rate of change of this gradient (the second derivative of pressure with respect to time). In an example implementation, these derived quantities of the pressure time series, considered together, may provide characteristic signatures of the start and end points of a snowfall event.

In step (3), the pressure gradient over a period of approximately one day immediately before the start of a snowfall event may be calculated, and the pressure gradient over a period of approximately one day immediately after the end of the snowfall may be calculated, using the start and end points detected in step (2). The difference between these two gradients divided by the total pressure change from the start to end points may be used to calculate the sensitivity of the drainage rate to changes in the water pressure. This relationship may be integrated through time to calculate the magnitude of the drainage signal for any given time during the snowfall event.

In step (4), the drainage signal as calculated in step (3) for any given time during the snowfall event may be added to the measured change in pressure from the start point to that given time. This gives the snow water equivalent that has accumulated up to that time.

In step (5), the uncertainty in the drainage-rate from step (3) may be calculated, e.g. using regression statistics that include the standard errors of the two gradients, the standard errors of their y-estimates and the instrumental uncertainty in the pressure measurements, combined in quadrature. To calculate the total uncertainty in the snow water equivalent at a given time, this uncertainty in the drainage-rate may be combined in quadrature with the instrumental uncertainty and the uncertainty in the average pressure calculated for that given time. This gives the uncertainty in the snow water equivalent.

Without wishing to be bound by any theory, the results shown in FIG. 4 provide further validation of the principle of using pressure data from an inland body of water to measure snowfall on a landscape scale within a region of interest.

It will be appreciated, for example, that the present disclosure describes systems and methods for directly measuring the mass of snowfall on a landscape scale within a region of interest. The measured mass of snowfall may correspond to, or be easily converted to, a measure of snow-water-equivalent. Thus, for example, a true snow-water-equivalent may be obtained, as opposed to a proxy value. Consequently, biases, inaccuracies and uncertainty may be reduced.

While the invention has been described with reference to certain example embodiments, various modifications will be apparent to a person skilled in the art without departing from the scope of the invention.

The invention claimed is:

1. A system for collecting data for use in measuring a mass of snowfall on a landscape scale within a region of interest comprising:
    a pressure sensor disposed beneath a surface of an inland body of water located within the region of interest, the pressure sensor being operable to measure water pressure;
    a data logger operably connected to the pressure sensor, the data logger being arranged to receive and log data from the pressure sensor; and
    a temperature sensor operable to measure a water temperature within the inland body of water, wherein the data logger is operably connected to the temperature sensor operable to measure the water temperature within the inland body of water and the data logger is arranged to receive and log data from the temperature sensor operable to measure the water temperature within the inland body of water.

2. The system according to claim 1 comprising a temperature sensor operable to measure a temperature of a portion of land within the region of interest, wherein the data logger is operably connected to the temperature sensor operable to measure the temperature of a portion of land within the region of interest and the data logger is arranged to receive and log data from the temperature sensor operable to measure the temperature of a portion of land within the region of interest.

3. The system according to claim 1, comprising a transmitter operable to transmit data from the data logger for analysis and/or processing at a location remote from the inland body of water.

4. The system according to claim 1, comprising: a breather tube extending upwards from the pressure sensor to a point above the surface of the inland body of water; or a barometric pressure sensor operable to measure an atmospheric pressure above the surface of the inland body of water.

5. The system according to claim 1, comprising a data processing device located at a location remote from the inland body of water, wherein the data processing device is arranged to analyse and/or process data from the data logger so as to calculate an estimated snow-water-equivalent for the region of interest.

6. The system according to claim 1, comprising at least two pressure sensors, each pressure sensor being disposed beneath a surface of an inland body of water located within the region of interest and operable to measure water pressure.

7. The system according to claim 6 comprising: a first pressure sensor disposed beneath a surface of a first inland body of water located within the region of interest; and one or more further pressure sensors, each further pressure sensor being disposed beneath a surface of a further inland body of water.

8. A system according to claim 7, wherein each further inland body of water is located within the same or a different region of interest as the first inland body of water.

9. Use of snowfall measurement data and/or one or more results of analysis and/or processing carried out on the snowfall measurement data obtained using a system according to claim 1 as an input for a weather model or a climate prediction model.

10. The system according to claim 1, wherein the pressure sensor is disposed at a substantially fixed location beneath the surface of the inland body of water.

11. A method of calculating a snow water equivalent of a snowfall event in a region of interest using water pressure data collected from a pressure sensor disposed beneath a surface of a body of water within the region of interest, the method comprising:
    excluding those parts of the water pressure data where snow may be melting;
    detecting a start point and an end point of each snowfall event from the water pressure data;
    calculating a water pressure change due to lake drainage during each snowfall event; and
    adding a measured water pressure change since the start point of the snowfall event to the calculated water pressure change due to drainage to give the snow water equivalent due to snowfall.

12. The method according to claim 11 further comprising calculating uncertainties in the snow water equivalent.

* * * * *